United States Patent
Ogawa

(10) Patent No.: US 9,527,176 B2
(45) Date of Patent: Dec. 27, 2016

(54) CONTROL DEVICE FOR MACHINE TOOL INCLUDING ROTARY INDEXING DEVICE

(71) Applicant: FANUC Corporation, Yamanashi (JP)

(72) Inventor: Yoshitsugu Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 111 days.

(21) Appl. No.: 14/519,544

(22) Filed: Oct. 21, 2014

(65) Prior Publication Data

US 2015/0115514 A1     Apr. 30, 2015

(30) Foreign Application Priority Data

Oct. 28, 2013  (JP) ................................ 2013-223591

(51) Int. Cl.
| | | |
|---|---|---|
| *B23Q 1/64* | (2006.01) | |
| *B23Q 3/08* | (2006.01) | |
| *G05B 19/402* | (2006.01) | |
| *B23Q 16/06* | (2006.01) | |

(52) U.S. Cl.
CPC .............. *B23Q 3/08* (2013.01); *G05B 19/402* (2013.01); *B23Q 16/065* (2013.01); *G05B 2219/39264* (2013.01)

(58) Field of Classification Search
USPC ....................................................... 30/269
See application file for complete search history.

(56) References Cited

U.S. PATENT DOCUMENTS

| | | | | |
|---|---|---|---|---|
| 3,825,245 A | * | 7/1974 | Osburn ................ | B23Q 7/1431 198/346.1 |
| 4,294,440 A | * | 10/1981 | Severt ................ | B23K 37/0461 269/71 |
| 4,462,579 A | * | 7/1984 | Satake ..................... | B23Q 1/28 108/20 |
| 4,705,438 A | * | 11/1987 | Zimmerman .......... | B23Q 1/525 108/9 |
| 5,121,039 A | | 6/1992 | Ishino et al. | |

(Continued)

FOREIGN PATENT DOCUMENTS

| | | |
|---|---|---|
| EP | 2620823 A1 | 7/2013 |
| JP | 63-68906 A | 3/1988 |

(Continued)

OTHER PUBLICATIONS

Decision to Grant a Patent mailed Feb. 10, 2015, corresponding to Japanese patent application No. 2013-223591.

(Continued)

*Primary Examiner* — Alvin Grant
(74) *Attorney, Agent, or Firm* — Hauptman Ham, LLP

(57) ABSTRACT

A rotary table is rotated by a machining load. A drive motor tries to return the rotary table to a positioned target position, and increases output torque. When the output torque reaches upper limit torque Tmax or when output torque which is equal to or greater than permissible torque Tp continues for predetermined time $\Delta T$, a target position which is sent to a drive motor is changed, thereby promoting reduction in output torque. If the output torque becomes smaller than permissible torque Tp, the target position is changed to bring position deviation of the drive motor equal to 0, and the position deviation is swiftly returned.

7 Claims, 5 Drawing Sheets

(56) References Cited

U.S. PATENT DOCUMENTS

| | | | | |
|---|---|---|---|---|
| 5,307,676 | A * | 5/1994 | Gutman | G01M 13/021 269/71 |
| 5,676,360 | A * | 10/1997 | Boucher | B23Q 1/52 269/57 |
| 5,918,510 | A | 7/1999 | Uemura et al. | |
| 6,184,972 | B1 * | 2/2001 | Mizutani | G03F 7/707 269/21 |
| 6,185,802 | B1 * | 2/2001 | Gruber | B23Q 1/5437 269/57 |
| 6,390,901 | B1 * | 5/2002 | Hiyama | B24D 9/085 451/285 |
| 8,911,282 | B2 * | 12/2014 | Mulder | B05B 13/0228 269/55 |
| 9,073,152 | B2 * | 7/2015 | Westwood | B23K 37/0435 |
| 9,272,793 | B2 * | 3/2016 | Larson | B64F 5/0009 |
| 2004/0180606 | A1 | 9/2004 | Iwashita et al. | |
| 2008/0125904 | A1 | 5/2008 | Osaki et al. | |
| 2009/0095126 | A1 * | 4/2009 | Hyatt | B23B 29/323 74/822 |
| 2012/0210551 | A1 * | 8/2012 | Yu | B23P 23/02 29/27 C |
| 2012/0326402 | A1 * | 12/2012 | Grob | B23Q 1/0009 279/134 |
| 2013/0200561 | A1 * | 8/2013 | Sun | B25H 1/02 269/59 |
| 2013/0292361 | A1 * | 11/2013 | Fischer | B23K 9/028 219/74 |
| 2013/0302128 | A1 * | 11/2013 | Miyazaki | B23Q 7/1426 414/749.6 |

FOREIGN PATENT DOCUMENTS

| | | |
|---|---|---|
| JP | 7-195258 A | 8/1995 |
| JP | H10-29125 A | 2/1998 |
| JP | 2004-288164 A | 10/2004 |
| JP | 2008-134861 A | 6/2008 |
| WO | 2012/132795 A1 | 10/2012 |

OTHER PUBLICATIONS

Office Action in DE Application No. 102014115481.9, mailed Jun. 22, 2016.

* cited by examiner

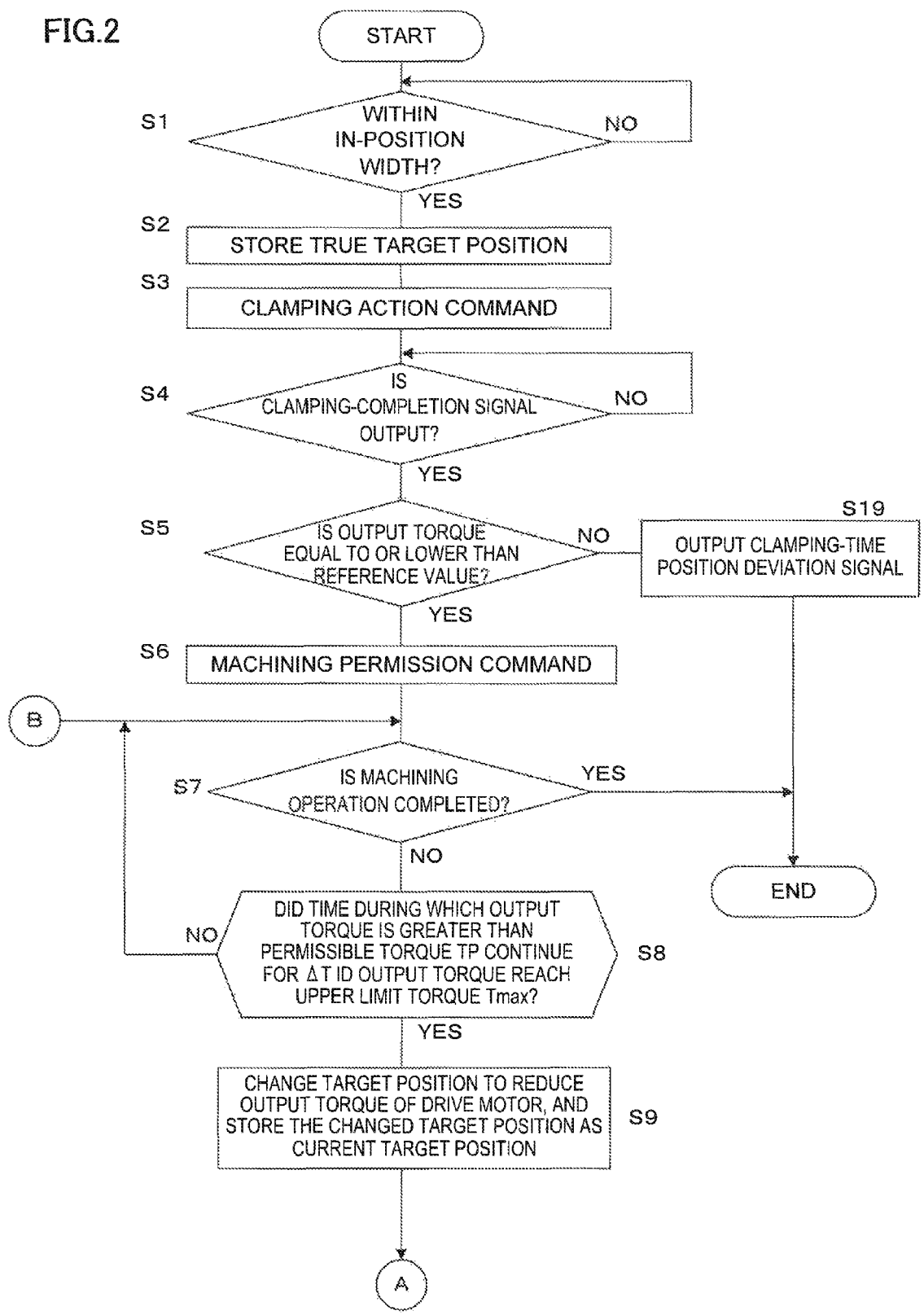

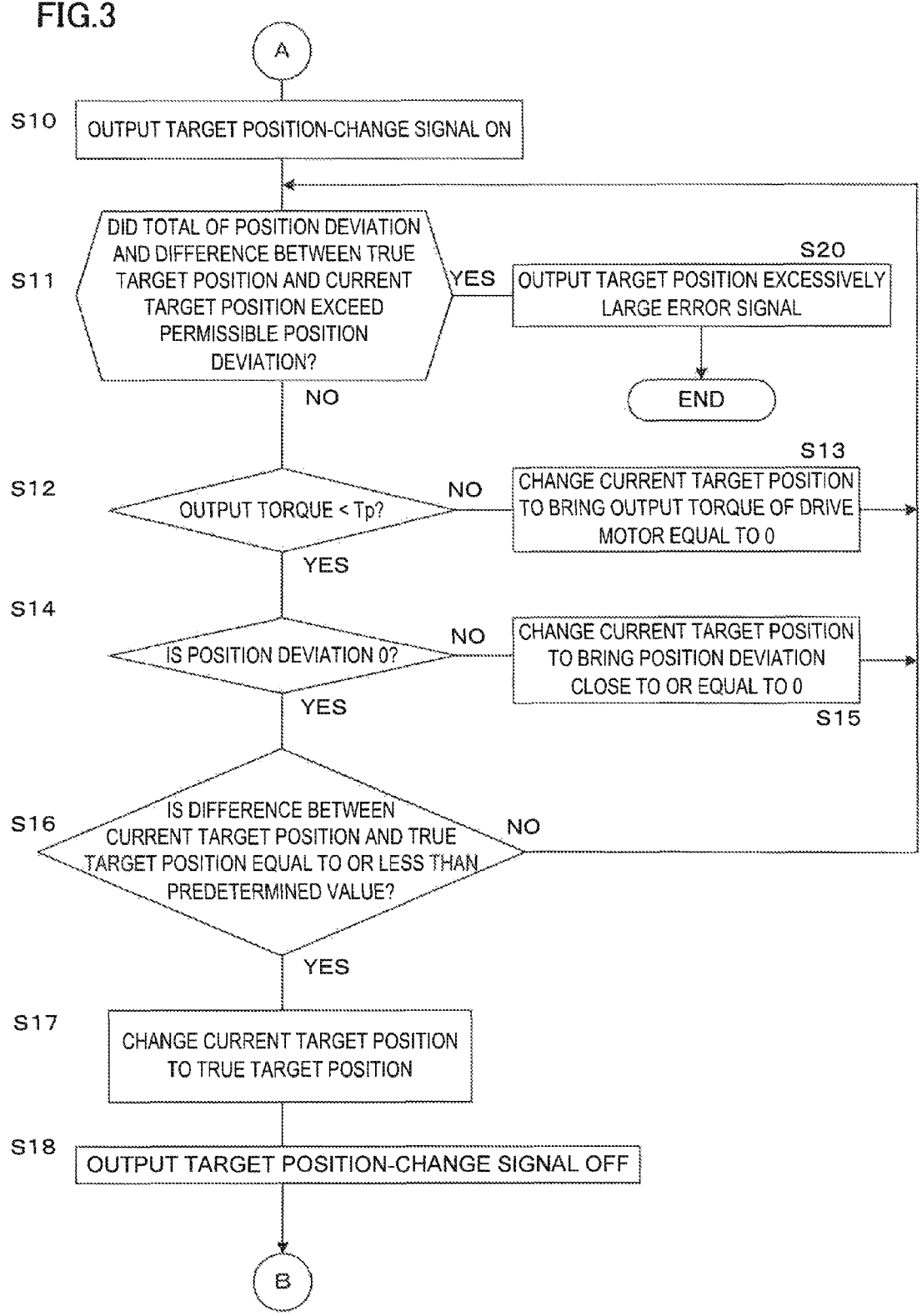

CONTROL DEVICE FOR MACHINE TOOL INCLUDING ROTARY INDEXING DEVICE

RELATED APPLICATIONS

The present application claims priority to Japanese Application Number 2013-223591, filed Oct. 28, 2013, the disclosure of which is hereby incorporated by reference herein in its entirety.

BACKGROUND OF THE INVENTION

1. Field of the Invention

The present invention relates to a control device for a machine tool. More specifically, the invention relates to a control device for a machine tool including a rotary indexing device composed of a rotary table on which a work is mounted, a clamping mechanism for holding an angular position of the rotary table, and a drive motor for driving the rotary table.

2. Description of the Related Art

In a machine tool including a rotary indexing device composed of a rotary table, a clamping mechanism for holding the rotary table, and a drive motor for driving the rotary table, a work is mounted on and fixed to the rotary table, the rotary table is rotated by the drive motor to position the rotary table to a predetermined angular position, the clamping mechanism is driven to clamp the table at the positioned position and then, the work is subjected to machining.

As the rotary indexing devices, one described in JP 10-29125 A is known. In the machine tool including such a rotary indexing device, a tool is brought into contact with a work mounted on and fixed to a rotary table to machine the work, but when the work is subjected to the machining, a load is applied to the work, and torque for rotating the rotary table is generated by this load. If the generated torque is great, the rotary table rotates against rigidity of the clamping mechanism in some cases. Hereinafter, position-holding force caused by rigidity of clamping mechanism for holding rotary table at predetermined rotation position is called clamping force. If the rotary table rotates from the positioned rotation position, the drive motor which drives the rotary table also rotates. Since the position of the drive motor is controlled, control for increasing output torque to return the rotary table to the positioned rotation position is performed, and the rotary table is held at the positioned rotation position by this position control.

If the rotary table is rotated by a machining load or the like and the rotation position deviates from the positioned rotation position (target rotation position), the drive motor outputs large output torque to resolve the deviation. If this state continues, the drive motor is brought into an excessive load state. As a method for preventing the drive motor from being brought into the excessive load state, JP 2008-134861 A describes a method in which if torque command sent to a drive motor becomes equal to or higher than a set value, the drive motor is prevented from being brought into the excessive load state by changing control of a speed controller from PI control (proportional integral control) to P control (proportional control), or by changing a gain of the speed controller, or by limiting a torque command value to a torque limit value or smaller by torque limit unit to drive a drive motor and suppress the output torque to a small value.

FIG. 5 shows a block diagram of a motor drive control system for controlling a position and speed of a servo-motor. A drive motor for driving the rotary table is also composed of a servo-motor, and a motor controller 24 controls a position and speed of the rotary table. A position controller 100 obtains position deviation by a position command and a position feedback signal from a position/speed detector 103 provided in the servo-motor, multiplies the position deviation by a position gain, and outputs the speed command to the speed controller. A speed controller 101 obtains speed deviation by a speed command and a speed feedback signal from the position/speed detector 103, performs proportional integral control (PI control), and outputs a torque command (current command) to a current controller 102. The current controller 102 performs current loop control by this torque command (current command) and a current feedback signal from a current detector (not shown) provided in a servo-amplifier, and drives and controls the servo-motor M through a servo-amplifier 25.

The drive motor for driving the rotary table is also composed of a servo-motor, and this motor controller 24 controls a position and speed of the drive motor. Hence, if the rotary table rotates and a position thereof is deviated from the positioned rotation position, position deviation at the position controller 100 increases, a speed command and a torque command also increase, the drive motor outputs large torque, control is performed to return the rotary table to a positioned angle (target position), control is performed such that the position deviation becomes 0, and position control is performed such that the rotary table is held at a positioned rotation position (target position). However, if a machining load is large, deviation of a rotation angle position cannot be reduced in some cases. The drive motor which drives the rotary table controls a position such that the rotary table is held at the positioned rotation position (target position) while the machine tool machines a work. Therefore, the rotary table is rotated by a machining load, rotation position is deviated from the positioned rotation position and position deviation increases. A speed command obtained by multiplying the position deviation by a position gain is output from the position controller 100, an integrator of the speed controller 101 integrates (I controls in PI control), and the torque command is increased. If the torque command increases, the drive motor is driven in a state where output torque is increased (drive current is increased) and there is concern that the drive motor is brought into the excessive load state and this causes overheating.

The rotary table is driven by the drive motor which drives the rotary table, the rotary table is positioned at a predetermined positioned angle position and then, the rotary table is clamped by the clamping mechanism, and the positioned rotation position is held. Generally, this positioning carried out by the drive motor is determined as being completed when the drive motor reaches a location within a certain width of a commanded position (positioned position) (when the drive motor comes into in-position), and the rotary table is clamped by the clamping mechanism. At the time of this clamping operation, the rotary table is clamped in a state where it is rotated in some cases. There is caused a case where although the rotation position of the drive motor is in-position, the rotation position does not match with a target rotation position (positioned rotation position). As a result, position deviation is generated (if in-position width is set large, possibility that the position deviation becomes great is high). If a clamping force of the clamping mechanism is great, the position deviation is maintained, the torque command increases, output torque of the drive motor also increases, and large output torque is continuously output. As a result, the drive motor is brought into an excessive load state, temperature of the drive motor reaches overheating temperature and the machine tool is stopped in some cases.

To prevent the excessive load state and overheating of the drive motor, in JP 2008-134861 A, if a torque command value becomes equal to or higher than a permissible torque, control of a speed controller is switched from PI control to P control or a torque command is limited to a torque limit value or lower, and a drive motor is driven while suppressing output torque thereof to a small value to prevent the generation of the excessive load state. However, even if time is very short, the drive motor cannot output the output torque which is necessary to resolve the position deviation with respect to such a machining load that a torque command value exceeds permissible torque. Even when drive motor output torque which is limited to very short time where influence on heat generation of the drive motor is small is also limited to small torque, position deviation remains, and machining precision is deteriorated in a portion where large drive motor output torque is instantaneously required.

SUMMARY OF THE INVENTION

Hence, the present invention provides a control device for a machine tool capable of preventing a drive motor which drives a rotary table from being brought into an excessive load state and from becoming overheated, capable of preventing the machine from stopping, and capable of swiftly resolving position deviation of the rotary table which is caused by increase in an instantaneously applied machining load.

In a control device for a machine tool including a rotary indexing device according to the present invention, the rotary indexing device includes: a rotary table on which a work is mounted and fixed; a clamping mechanism for clamping the rotary table; and a drive motor which includes a motor controller configured to control a rotation position and speed, and rotate and drive the rotary table, the control device comprises a drive motor output torque detecting unit configured to detect output torque of the drive motor, a position deviation detecting unit configured to detect position deviation from the motor controller, and target position changing unit in which the rotary table is configured to be clamped by the clamping mechanism at a target position of a predetermined rotation angle position, and on a condition that time during which output torque of the drive motor detected by the drive motor output torque detecting unit is equal to or higher than a preset permissible torque continues for predetermined time or the output torque of the drive motor detected by the drive motor output torque detecting unit reaches preset upper limit torque while a work mounted on the rotary table is being machined, configured to change a target position such that the output torque of the drive motor is brought close to or equal to 0 if the detected output torque is equal to or higher than the permissible torque, and change the target position by increments such that detected position deviation is brought close to or equal to 0 if the detected output torque is smaller than the permissible torque. It is possible to employ such a configuration that when position deviation detected by the position deviation detecting unit is 0 and a difference between a target position changed by the target position changing unit and a target position clamped by the clamping mechanism is smaller than a predetermined value, the target position returning unit returns the changed target position to an original target position when the rotary table is clamped.

According to this, if the rotary table tries to rotate by a machining load generated when a work mounted on and fixed to the rotary table is machined, output torque of the drive motor which drives the rotary table is not reduced until time during which the output torque is less than upper limit torque and exceeds permissible torque reaches predetermined time, the output torque is continuously output and a rotation position is held. Therefore, machining precision is not lowered with respect to increase in a machining load for a short time.

If a state where the output torque exceeds the permissible torque continues for predetermined time or if the output torque reaches the upper limit torque, the target position is changed by increments such that output torque of the drive motor becomes close to or equal to 0 until the output torque becomes smaller than the permissible torque. Therefore, it is possible to prevent the excessive load state and overheating of the drive motor, and to prevent the machine from stopping. Therefore, it is possible to enhance an operation rate of the machine. If the target position is changed such that the output torque of the drive motor becomes close to or equal to 0, this change in the target position increases position deviation, and machine error is increased. However, the machining load is normally increased for a very short time, and the position is held for the predetermined time during which output torque is less than the upper limit torque and exceeds the permissible torque. Therefore, time during which the output torque is changed such that the output torque becomes close to or equal to 0 is short, and a period during which machine error becomes large is normally extremely short.

It is possible to employ such a configuration that when a target position is changed by the target position changing unit, target position-change signal output unit turns ON a target position-change signal indicating that the target position is changed and the target position-change signal output unit outputs this target position-change signal, and when the target position returning unit returns the target position to the original target position when the rotary table is clamped, the target position-change signal output unit turns the target position-change signal OFF. According to this, a machined section where the target position is changed can be detected. It is possible to know that a work is machined in a state where the rotary table is deviated in position by an ON signal of the target position-change signal which indicates that the target position is changed. Therefore, it is possible to know a machining region having a possibility that machining precision is deteriorated.

It is possible to employ such a configuration that the clamping mechanism clamps the rotary table at a target position of a predetermined rotation angle position, and the control device further includes clamping-time position deviation signal output unit which outputs a clamping-time position deviation signal if output torque detected by the drive motor output torque detecting unit becomes equal to or higher than a predetermined value before a machining operation is started. According to this, when the rotary table is clamped by the clamping mechanism, the rotary table is clamped in a state where the rotary table rotates and a position thereof is deviated due to a clamping error or the drive motor is positioned within the in-position width. However, it is possible to discover that the rotary table is clamped in a state where large position deviation within the in-position width remains. It is possible to detect that a clamping error in which the rotary table is rotated and clamped when the rotary table is clamped by the clamping mechanism is generated, and it is possible to prevent a useless machining operation caused by clamping error.

It is possible to employ such a configuration that the control device further includes a target position excessively large error signal output unit, the target position excessively large error signal output unit outputting a signal when a difference between a target position clamped by the clamping mechanism and a target position changed by the target position changing unit reaches permissible position deviation. According to this, it is possible to know that position deviation from the target position becomes excessively large and machining error is large. It is possible to know that position deviation of the rotary table is large and machining error is large by a signal from the target position excessively large error signal output unit, and it is possible to detect machining failure.

It is possible to employ such a configuration that the drive motor output torque detecting unit detects, as the drive motor output torque, a torque command which is output from a speed controller of the motor controller of the drive motor. According to this, the drive motor output torque detecting unit detects output torque by detecting drive current of the drive motor.

BRIEF DESCRIPTION OF THE DRAWINGS

These and other objects and features of the present invention will become clear by the following description of a preferred embodiment with reference to the accompanying drawings, wherein:

FIG. 2 shows a partial flowchart showing algorithm of target position changing processing carried out for a drive motor which drives a rotary table in the embodiment;

FIG. 3 shows a flowchart following FIG. 2;

DETAILED DESCRIPTION OF THE EMBODIMENTS

Figure 1A:
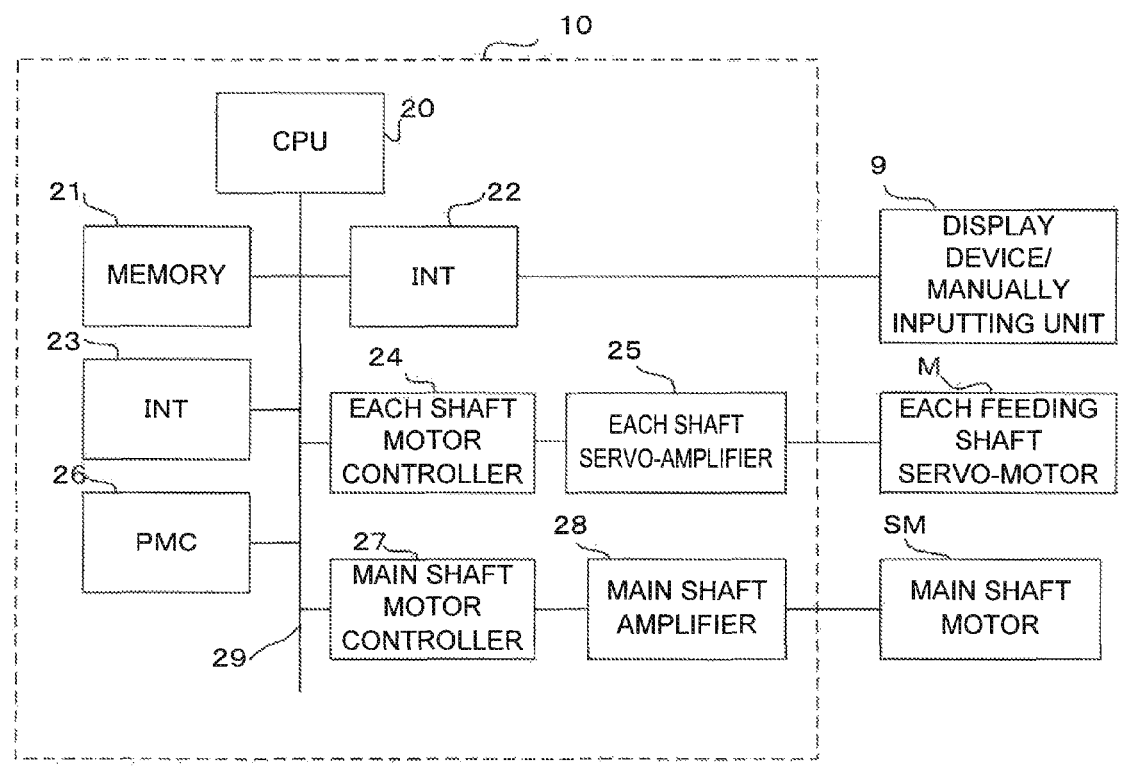
FIG. 1A shows a block diagram of a controller which drives and controls a machine tool according to an embodiment of the present invention.

FIG. 1A is a block diagram of a controller which drives and controls a machine tool according to an embodiment.

Figure 1B:
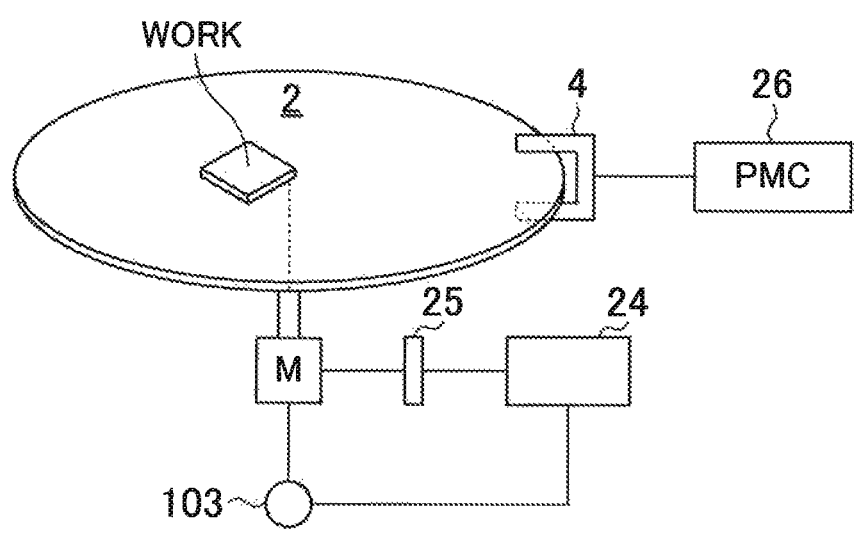
FIG. 1B is a schematic diagram showing an arrangement including a rotary table, a clamping mechanism, a drive motor and a control device according to an embodiment.

A reference sign 10 represents a numeric value control device as a control device which controls a machine tool. A CPU 20 is a processor which totally controls the numeric value control device 10, and the CPU 20 is connected to a memory 21, interfaces 22 and 23, an each shaft motor controller 24, a PMC (programmable machine controller) 26 and a main shaft motor controller 27 through buses 29. The CPU 20 retrieves a system program stored in a ROM in the memory 21 through the bus 29, and controls the entire numeric value control device 10 in accordance with the system program. The memory 21 includes the ROM, a RAM and a nonvolatile memory. The system program is stored in the ROM. Temporary calculation data, display data and various data which is input through a display device/manually inputting unit 9 are stored in the RAM. The nonvolatile memory is composed of a SRAM which is backed up using a battery. Software for carrying out target position changing processing of the drive motor which drives the rotary table when the rotary table is clamped is stored in the nonvolatile memory. The interface 23 connects the numeric value control device 10 and external devices to each other. The PMC (programmable machine controller) 26 is a sequence program stored in the numeric value control device 10, and outputs a signal to an auxiliary device of a machine tool which is to be controlled, and controls the auxiliary device. As schematically illustrated in FIG. 1B, a clamping mechanism 4 is connected to this PMC 26, a work is mounted on a rotary table 2, a drive motor (servo-motor) M is arranged for driving the rotary table 2, and the each shaft motor controller 24 receives feedback from a position/speed detector 103 embedded in the drive motor M and outputs a command to a servo-amplifier 25 to drive the drive motor M.

The display device/manually inputting unit 9 is connected to the interface 22. The display device/manually inputting unit 9 includes the display device composed of liquid crystal and a CRT, and a manually inputting unit composed of a keyboard.

A drive motor (servo-motor) for driving the rotary table and an each-shaft motor controller 24 which controls an each feeding shaft servo-motor for machining receive an each feeding shaft position command (moving command amount) from the CPU 20, output the each-feeding shaft command to the servo-amplifier 25, and drive the each-feeding shaft servo-motor M. The drive motor which drives the rotary table is also composed of a servo-motor, and a position and speed of the drive motor are controlled by a shaft motor controller 24.

Figure 5:
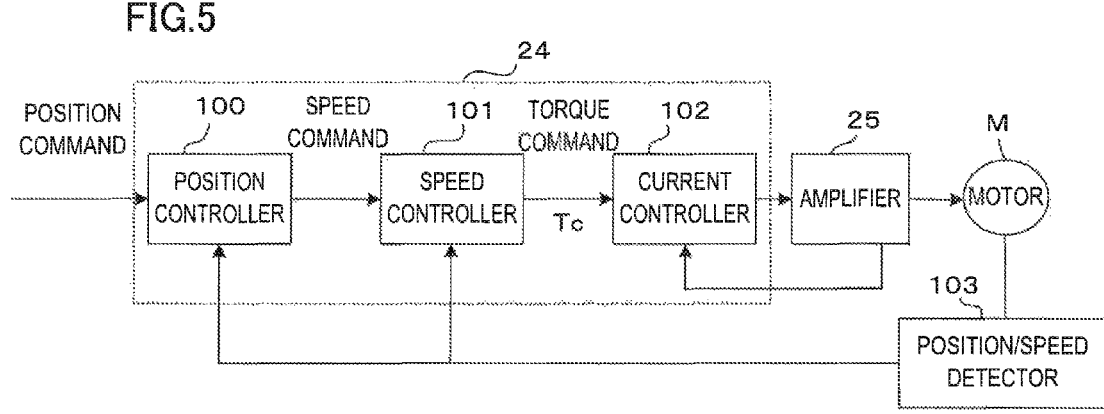
FIG. 5 shows a block diagram of a motor drive control system which controls a position and speed of a servo-motor.

As shown in FIG. 5, the each-shaft motor controller 24 includes a position controller 100, a speed controller 101 and a current controller 102. The each shaft motor controller 24 receives feedback signals of a position, speed and current from the position/speed detector 103 embedded in the servo-motor M and a current detector (not shown), and feedback controls the position, the speed and the current. The rotary table is also composed of one of feeding shafts, the drive motor which drives the rotary table is composed of a servo-motor, and the drive motor is controlled by one of motor controllers of the each shaft motor controller 24.

The main shaft motor controller 27 receives a main shaft rotation speed command from the CPU 20, and outputs a main shaft speed signal to the main shaft amplifier 28. The main shaft amplifier 28 receives the main shaft speed signal, rotates a main shaft motor SM at commanded rotation speed (rotation number), receives a feedback pulse which is fed back in synchronization with rotation from a position coder (not shown), and feedback controls speed such that the speed matches the main shaft rotation speed command.

A configuration of the numeric value control device 10 is the same as that of a conventional numeric value control device which controls a machine tool except that software of target position changing processing carried out for the drive motor which drives the rotary table when the rotary table is clamped is stored in the memory 21.

FIGS. 2 and 3 are flowcharts showing algorithm of the target position changing processing carried out for the drive motor which drives the rotary table when the rotary table is clamped and while a work mounted on the rotary table is being machined.

After a moving command for moving the rotary table to a machining-start position (target position) is output, if a clamping command for clamping the rotary table at a positioning position (target position) is output, the CPU 20 checks in-position (step S1). It is determined whether a position of the drive motor (servo-motor) M which drives the rotary table is within an in-position width of the commanded target position. The in-position width is previously set using a parameter, and if the rotary table reaches the in-position width of the commanded target position, it is determined that the positioning operation is completed. If it is determined that the rotary table is within the in-position width, this commanded positioning position (target position) is stored as a true target position (step S2), a clamping action command is output (step S3), the clamping mechanism is driven and the rotary table is clamped.

If a clamping-completion signal is input from the clamping mechanism (step S4), it is determined whether output torque of the drive motor M which drives the rotary table is equal to or lower than a reference value which is preset for determining a clamping error (step S5). In this embodiment, a torque command Tc which is output from the speed controller of the shaft motor controller 24 of the drive motor (servo-motor) M which drives the rotary table is detected instead of detecting the output torque of the drive motor M.

If the rotary table is clamped at the positioning position (target position), the motor M which drives the rotary table is also positioned at the positioning position (target position), position deviation at the servo-controller of the drive motor is substantially "0", and there is almost no output torque of the drive motor. On the other hand, when the rotary table is clamped, if the rotary table rotates and the rotary table is clamped at a position deviated from the positioning position (target position), since it is deviated from the positioning position (target position), position deviation is generated. When the rotary table is within the in-position width and the positioning of the rotary table is completed and the rotary table is clamped, even if the rotary table is within the in-position width, if the commanded positioning position (target position) and the actually clamped position are different from each other, position deviation is generated. In association with generation of this position deviation, the shaft motor controller 24 of the drive motor which drives the rotary table drives the drive motor M to resolve this position deviation. On the other hand, since the rotary table is clamped, it is difficult to rotate the rotary table. Therefore, the shaft motor controller 24 increases torque command, and increases the output torque of the drive motor M to resolve the position deviation. Hence, after the rotary table is clamped, if the output torque (torque command Tc) exceeds the set reference value before a machining operation is started, it is determined that a clamping error occurs, a position deviation signal is output at the time of clamping, the signal is displayed on the display device of the display device/manually inputting unit 9 to promote retry of the clamping of the rotary table (step S19), and this processing is completed.

On the other hand, if the rotary table is positioned at the positioning position (target position) and the position is not deviated (step S5), a machining-permitting signal is output, and a machining operation for a work mounted on the rotary table is started (step S6).

It is determined whether the machining operation is completed (step S7), it is determined whether time during which torque command Tc is greater than set permissible torque Tp continues for more than set permissible time ΔT, or it is determined whether torque command Tc reaches set upper limit torque Tmax or more (step S8). Thereafter, processing of steps S7 and S8 is carried out during the machining operation, and if the torque command Tc does not reach the upper limit torque Tmax and if the machining operation is completed in a state where time during which torque command Tc is greater than set permissible torque Tp falls within the permissible time ΔT, the output torque control processing is completed.

That is, a machining load is applied from a tool to a work during the machining operation, but this machining load is also applied to the drive motor which drives the rotary table through the rotary table. If this machining load is large and a force trying to rotate the rotation motor caused by this machining load is greater than a clamping force of a position holding force caused by rigidity of the clamping mechanism which clamps the rotary table, torsion is generated in the clamping mechanism, the rotary table rotates and the position is deviated from the positioning position (target position). In association with this, the drive motor is also deviated from the positioning position (target position), position deviation of the position controller of the motor controller increases, a speed command applied to the speed controller also increases, a value of integral of the integrator of the speed controller also increases, the torque command Tc and the output torque increase, and these facts act to hold the rotary table at the positioning position (target position).

Figure 4A:
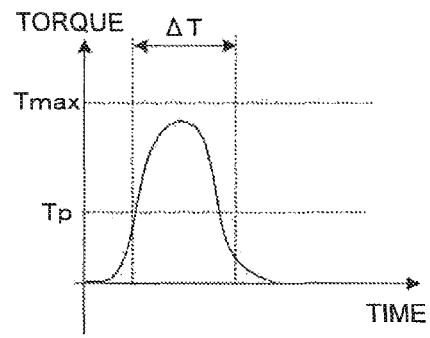
FIGS. 4A, 4B and 4C show explanatory diagrams of output torque and the target position changing processing in the embodiment.

As shown in FIG. 4A, if the output torque (torque command Tc) does not reach the upper limit torque Tmax and time during which the torque command TC is smaller than the upper limit torque Tmax and greater than the permissible torque Tp is shorter than the permissible time ΔT, it is determined that overheating of the motor can be avoided, and the machining operation is continued as it is. If the output torque (torque command Tc) increases, this unit that a machining load is greater than a clamping force of the clamping mechanism and the rotary table is held at the positioning position (target position) by the output torque of the drive motor. According to this, position is not deviated and the machining precision is enhanced. The permissible torque Tp is set to 70% of rated torque, permissible time ΔT is set to 100 msec, and the upper limit torque Tmax is set to about 70% of output torque of the drive motor.

Next, if output torque (torque command Tc) becomes greater than the upper limit torque Tmax or if time during which torque command TC exceeds the permissible torque Tp becomes longer than the permissible time ΔT, the procedure proceeds from step S8 on to step S9, the target position is changed to reduce output torque of the drive motor, and this target position is stored as a current target position. In this embodiment, the target position is changed by a minimum unit Pmin of the position command. If the output torque (torque command Tc) is positive torque, the output torque can be made small by giving negative moving command to the drive motor. Therefore, a moving command of negative minimum unit Pmin is given to the drive motor and the target position is changed.

That is, if the output torque (torque command Tc) is a positive value, a moving command of the negative minimum unit Pmin is output to the motor controller, and if the output torque (torque command Tc) is a negative value, a moving command of the positive minimum unit Pmin is output to the motor controller, and the target position is changed. If this moving command is input to the position controller of the shaft motor controller 24 of the drive motor which drives the rotary table, position deviation of the position controller is reduced (when output torque is positive, position deviation is positive, and when output torque is negative, position deviation is negative, and if a moving command of a minimum unit Pmin having one of a positive sign and a negative sign which is opposite from output torque is input, an absolute value of position deviation becomes small). If the position deviation becomes small, the output torque becomes small. A value obtained by adding a moving command value to a true target position stored in step S2 (+Pmin or −Pmin) is stored as a current target position (step S9).

Since the target position is changed, a target position-change signal is turned ON and is output, and a fact that the target position is changed is displayed on the display unit of the display device/manually inputting unit 9 (step S10).

Next, a total of a difference between the true target position and the current target position and position deviation retrieved from the position controller is obtained, and it is determined whether this total exceeds the set permissible position deviation (step S11). Since this total shows a deviation amount from the target position (positioning position), if this total exceeds the permissible position deviation, a target position excessively large error signal is output (step S20), a target position excessively large error is displayed on the display device/manually inputting unit 9, and this processing is completed.

When the total does not exceed the permissible position deviation, it is determined whether output torque (torque command Tc) is smaller than permissible torque Tp (step S12), and if the output torque (torque command Tc) is equal to or larger than permissible torque Tp, output torque of the drive motor is output to the motor controller of the position command of the minimum unit Pmin so that the output torque of the drive motor becomes 0, the current target position is changed (step S13), and the procedure is returned to step S11. Thereafter, processing from step S11 to step S13 is repeatedly executed until the output torque (torque command Tc) of the drive motor becomes smaller than the permissible torque Tp, and the current target position is changed. If the output torque of the drive motor exceeds the permissible torque Tp, a machining load is large and the drive motor is in the excessive load state, and there is concern that overheating occurs. Hence, a position command is output such that the output torque of the drive motor becomes 0 and the current target position is changed. According to this, output torque of the drive motor is suppressed, and it is possible to prevent the drive motor from being brought into the excessive load state and from being overheated.

If the output torque (torque command Tc) of the drive motor becomes smaller than the permissible torque Tp, the procedure proceeds from step S12 on to step S14, position deviation is retrieved from the position controller of the shaft motor controller 24 of the drive motor which drives the rotary table, it is determined whether the position deviation is 0, and if the position deviation is not 0, a position command of the minimum unit Pmin is output to bring the position deviation close to or equal to 0, the current target position is changed (step S15), and the procedure is returned to step S11. Processing from step S11 to step S15 is repeatedly executed, and if the position deviation becomes 0, the procedure proceeds from step S14 on to step S16, it is determined whether the current target position and the true target position are equal to or lower than a preset predetermined value (e.g., 2 to 3 Pmin). If they are not equal to or lower than the predetermined value, the procedure is returned to step S11, and processing from step S11 to step S16 is repeatedly executed. Then, if the difference between the current target position and the true target position becomes equal to or smaller than the predetermined value, the procedure proceeds from step S16 on to step S17, the current target position is changed to the true target position, and a target position-change signal OFF is output (step S18). In step S10, a target position-change signal ON is output, and a target position change state is indicated, but the target position-change signal is turned OFF, thereby showing that the current target position and the true target position match each other. The procedure is returned to step S7, and processing in above-described step S7 and subsequent steps is continued.

If an indication, of a target position change state which is displayed by output of the target position-change signal ON in step S10 and is erased by output of the target position-change signal OFF in step S18, is displayed for a long time during the machining operation, this indicates that the machining operation is carried out for a long time in the position deviation state. If this indication is displayed for a long time, machining conditions should be changed, and this is useful for adjusting the machining conditions.

Figure 4C:
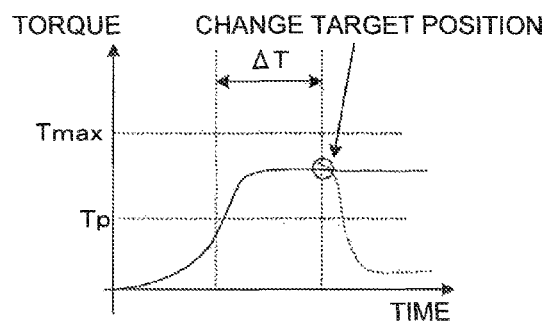
Figure 4B:
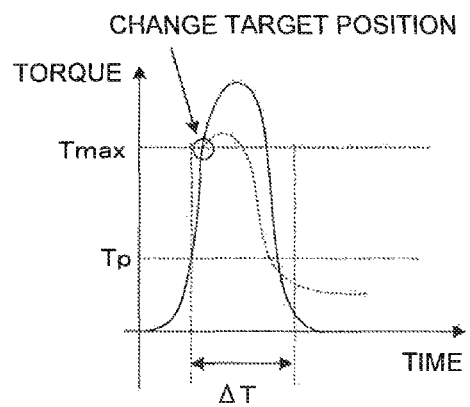

FIGS. 4A and 4B are diagrams for explaining timing at which target position changing processing of step S9 and subsequent steps is executed. If the output torque (torque command Tc) of the drive motor exceeds the upper limit torque Tmax as shown in FIG. 4B, target position changing processing in step S9 and subsequent steps is executed. If the output torque (torque command Tc) does not reach the upper limit torque Tmax but time during which the output torque (torque command Tc) exceeds the permissible torque Tp continues for the permissible time $\Delta T$ or longer, the target position changing processing in step S9 and subsequent steps is executed.

If the target position changing processing is carried out, a position command is output so that the output torque is reduced by processing in step S9 and step S13 until the output torque (torque command Tc) becomes smaller than the permissible torque Tp, and the current target position is changed. Hence, the output torque is abruptly reduced as shown in FIGS. 4B and 4C, and the drive motor is prevented from being brought into the excessive load state, and control is performed so that overheating is not generated.

If the position command is output so that the output torque is reduced by the processing in step S9 and step S13 and the current target position is changed, position deviation of the rotary table is increased, and a machining error becomes large. However, a machining load becomes excessively large usually only for a short time, and the processing in step S9 and step S13 is carried out after time during which the output torque (torque command Tc) in step S8 exceeds the permissible torque Tp continues for the permissible time $\Delta T$ or when the output torque (torque command Tc) reaches the upper limit torque Tmax. In addition to that, when the output torque (torque command Tc) does not reach the upper limit torque Tmax but load torque exceeding the permissible torque Tp is generated (for example, section of this load torque is regarded as time width Ta), driving torque is generated so that the positioning position (target position) is held only for the permissible time $\Delta T$ in step S8 and then, step S9 and step S13 are executed. Therefore, a section where a machining error is generated by the processing in step S9 and step S13 is Ta−$\Delta T$, and a section Ta where such an excessive load is generated is usually within a short time. As a result, a section Ta−$\Delta T$ where a machining error is generated is extremely short time.

An excessive machining load generated by the upper limit torque Tmax continues for a very short time, the processing in step S9 and step S13 also continues for an extremely very short time, and a generated machining error is very small.

If load torque is reduced, the rotary table is returned to the positioning position (true target position) by a restoring force (clamping force of clamping mechanism, i.e., position holding force) of torsion of the clamping mechanism. On the other hand, since the current target position is changed such that it is deviated from the true target position by the processing of step S9 and step S13, the rotary table is returned to the positioning position (true target position) and thus, the position deviation is increased.

If the output torque (torque command Tc) becomes smaller than the permissible torque Tp, a position command is output so that the position deviation becomes 0 by the processing of step S14 and step S15 and the current position is changed. Therefore, variation in the output torque (torque command Tc) is suppressed. If the current target position is changed such that the position deviation becomes 0, the current target position is brought close to the actual position. Since the actual position is brought close to the true target position by a restoring force (clamping force of clamping mechanism, i.e., position holding force) of torsion of the clamping mechanism and thus, the actual position is brought close to the current target position.

Usually, a large machining load which can rotate the clamped rotary table is applied only for a short period, and if the machining load becomes small, the output torque of the drive motor swiftly becomes smaller than the permissible torque Tp by reduction in the machining load and by the processing in step S13. The torque command Tc is output from the speed controller of the shaft motor controller 24, and the torque command Tc is output of the proportional integral control (PI control) of the speed controller. Hence, magnitude of the torque command value is largely influenced by a value of integral, and if the output torque (torque command Tc) of the drive motor is reduced by processing in step S13, the value of integral becomes small and the torque command Tc becomes small. Hence, a symbol (positive symbol or negative symbol) of the position deviation is reversed in some cases. For example, when position deviation is a positive value and the torque command Tc is also a positive value, the position deviation is brought into a negative value to reduce the value of integral of the speed controller, thereby abruptly reducing the torque command Tc (output torque of drive motor). When load torque is abruptly reduced during processing of steps S12 and S13, since the actual position is returned to the true target position by the position holding force of the clamping mechanism as described above, the position deviation is further increased.

If the output torque (torque command Tc) becomes smaller than the permissible torque Tp, the procedure proceeds from step S12 on to steps S14 and S15, a position command is output to bring the position deviation close to or equal to 0, and the current position is changed. If the current target position is changed to bring the position deviation close to or equal to 0, this indicates that the current target position is brought close to the actual position, variation in the output torque is reduced and control is stabilized. The current target position is brought close to the true target position.

When a symbol of the output torque and a symbol of the position deviation are different from each other (such as when torque command Tc is positive value and position deviation is negative value as in the previous example), if the position deviation is brought close to 0, the torque command Tc and the output torque are increased. If the torque command Tc and the output torque are increased and the output torque (torque command Tc) exceeds the permissible torque Tp, processing in steps S12 and S14 is carried out. However, in a state where an excessive machining load is applied only instantaneously and a large machining load which can rotate the rotary table is not already applied, since the rotary table is clamped by the clamping mechanism, even if the output torque (torque command Tc) increases, a force exceeding the clamping force is not generated and there is no influence.

When a large machining load which can rotate the rotary table against a clamping force is applied for a long time, a position command is output to bring the output torque equal to 0 by the processing in step S13, the current target position is changed (difference between current target position and true target position increases) and the output torque is reduced. According to this, position deviation is increased by the continuing machining load. If a large machining load continues for a long time, a total of position deviation and a difference between the true target position and the current target position increases. If this total increases, this indicates that a machining error becomes large. Hence, in this embodiment, if this total exceeds the permissible position deviation, the procedure proceeds from step S11 on to step S20, a target position excessively large error signal is output, enlargement of error is displayed on the display unit of the display device/manually inputting unit 9, and this processing is completed. Processing in step S11 is brought into processing for determining whether a difference between the true target position and the current target position exceeds the permissible position deviation, and it is unnecessary to take the position deviation into account. However, if the position deviation is taken into account, the processing becomes more precise. In the processing in step S11 and step S20, this embodiment configures target position excessively large error signal output unit.

Although the torque command Tc applied to the drive motor which drives the rotary table is obtained instead of output torque in the above-described embodiment, the output torque may directly be detected. Further, since the output torque is proportional to drive current, the output torque may be detected by detecting the drive current of the drive motor. In this case, it is possible to detect a feedback signal of drive current from the current detector which is fed back to the current controller 102 of the shaft motor controller 24, and it is possible to use the drive current instead of the output torque.

In this embodiment, when a machining load is applied to the rotary table and a large load is applied to the drive motor which drives the rotary table, a target position of the rotary table (drive motor) is changed to reduce the load, the rotary table is prevented from being brought into an excessive load state, and if the excessive load is applied for a short time, the target position is swiftly returned, a machining error is made small, and machining precision is enhanced as described above. When the excessive load is applied for a long time and position deviation continues for a long time, a fact that a position error is excessively large is displayed. According to this, it is possible to know that a machining operation at that time has a large machining error.

The invention claimed is:
1. A control device for a machine tool including a rotary indexing device, the rotary indexing device comprising:
a rotary table on which a work is to be mounted and fixed;
a clamping mechanism configured to clamp the rotary table;
a drive motor configured to rotate and drive the rotary table; and
a motor controller configured to control a rotation position and a speed of the drive motor,
wherein the rotary table is configured to be clamped by the clamping mechanism at a target position of a predetermined rotation angle position, wherein the control device comprises a processor configured to
  detect an output torque of the drive motor,
  obtain a position deviation from the motor controller, and
  execute a target position changing processing on a condition that a time, during which the detected output torque of the drive motor is equal to or higher than a preset permissible torque, continues for a predetermined time or the detected output torque of the drive motor reaches a preset upper limit torque while a work mounted on the rotary table is being machined, and
wherein, in executing the target position changing processing, the processor is configured to
  change the target position such that the output torque of the drive motor is brought close to or equal to 0 if the detected output torque is equal to or higher than the permissible torque, and
  change the target position by increments such that the obtained position deviation is brought close to or equal to 0 if the detected output torque is smaller than the permissible torque.

2. The control device according to claim 1, wherein
the processor is further configured to return the target position changed by the target position changing processing to an original target position of when the rotary table is clamped, when
  the detected position deviation is 0, and
  a difference between the target position changed by the target position changing processing and a target position clamped by the clamping mechanism is smaller than a predetermined value.

3. The control device according to claim 2, wherein
the processor is further configured to
  turn on a target position-change signal indicating that the target position is changed and output this target position-change signal when the target position is changed by the target position changing processing, and
  turn the target position-change signal off when the target position is returned to the original target position of when the rotary table is clamped.

4. The control device according to claim 1, wherein
the processor is further configured to output a clamping-time position deviation signal when the detected output torque of the drive motor becomes equal to or higher than a predetermined value before a machining operation is started.

5. The control device according to claim 1, wherein
the processor is further configured to output a target position excessively large error signal when a difference between a target position clamped by the clamping mechanism and the target position changed by the target position changing processing reaches a permissible position deviation.

6. The control device according to claim 1, wherein
the processor is configured to detect, as the output torque of the drive motor, a torque command which is output from a speed controller of the motor controller of the drive motor.

7. The control device according to claim 1, wherein
the processor is configured to detect the output torque of the drive motor based on a drive current of the drive motor.

* * * * *